(12) United States Patent
Park et al.

(10) Patent No.: US 12,235,681 B2
(45) Date of Patent: Feb. 25, 2025

(54) ELASTIC MEMBER AND DISPLAY DEVICE INCLUDING SAME

(71) Applicant: LG INNOTEK CO., LTD., Seoul (KR)

(72) Inventors: Duck Hoon Park, Seoul (KR); Hyun Dong Cho, Seoul (KR); Kweon Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 44 days.

(21) Appl. No.: 18/018,352

(22) PCT Filed: Jul. 23, 2021

(86) PCT No.: PCT/KR2021/009523
§ 371 (c)(1),
(2) Date: Jan. 27, 2023

(87) PCT Pub. No.: WO2022/030830
PCT Pub. Date: Feb. 10, 2022

(65) Prior Publication Data
US 2023/0288959 A1    Sep. 14, 2023

(30) Foreign Application Priority Data
Aug. 4, 2020   (KR) .................. 10-2020-0097353

(51) Int. Cl.
*G06F 1/16*      (2006.01)
*F16C 11/04*     (2006.01)

(52) U.S. Cl.
CPC ............ *G06F 1/1641* (2013.01); *F16C 11/04* (2013.01)

(58) Field of Classification Search
CPC ......... G06F 1/1641; G06F 2203/04102; G06F 2203/04103; G06F 1/1652; G06F 3/0412; F16C 11/04; F16C 11/12; G09F 9/301
See application file for complete search history.

(56) References Cited

U.S. PATENT DOCUMENTS 9,176,535 B2   11/2015   Bohn et al.
9,348,362 B2    5/2016   Ko et al.
(Continued)

FOREIGN PATENT DOCUMENTS

CN    110853525    2/2020
JP    2014-111280  6/2014
(Continued)

OTHER PUBLICATIONS

International Search Report dated Nov. 2, 2021 issued in Application No. PCT/KR2021/009523.
(Continued)

*Primary Examiner* — Rockshana D Chowdhury
(74) *Attorney, Agent, or Firm* — KED & ASSOCIATES, LLP (57) ABSTRACT

An elastic member according to an embodiment is an elastic member including a first region and a second region, wherein the elastic member has surface roughness having a longitudinal direction, the first region is defined as a folding region, the second region is defined as an unfolding region, a first pattern part having a long direction and a short direction is formed in the first region of the elastic member, and the long direction of the first pattern part is different from the longitudinal direction of the surface roughness.

17 Claims, 9 Drawing Sheets

(56) References Cited

U.S. PATENT DOCUMENTS

| | | | |
|---|---|---|---|
| 10,056,568 B2 | 8/2018 | Min et al. | |
| 10,541,373 B2* | 1/2020 | Park | G06F 1/1652 |
| 10,553,802 B2 | 2/2020 | Min et al. | |
| 10,683,591 B1* | 6/2020 | Podhajny | D03D 11/02 |
| 10,915,139 B2* | 2/2021 | Park | G06F 1/1641 |
| 11,031,565 B2 | 6/2021 | Min et al. | |
| 11,204,627 B2* | 12/2021 | Park | H04M 1/0268 |
| 11,258,035 B2* | 2/2022 | Kim | H05K 1/147 |
| 11,395,415 B2* | 7/2022 | Gu | G06F 1/1601 |
| 11,455,004 B2* | 9/2022 | Kinoshita | G06F 1/1681 |
| 11,656,655 B2* | 5/2023 | Shin | G06F 1/1643 |
| | | | 361/679.27 |
| 11,662,780 B2* | 5/2023 | Park | G06F 1/1616 |
| | | | 361/679.01 |
| 11,711,964 B2 | 7/2023 | Min et al. | |
| 2011/0070461 A1 | 3/2011 | Yamada et al. | |
| 2012/0307423 A1 | 12/2012 | Bohn et al. | |
| 2014/0226275 A1 | 8/2014 | Ko et al. | |
| 2015/0049428 A1 | 2/2015 | Lee et al. | |
| 2016/0357052 A1 | 12/2016 | Kim et al. | |
| 2017/0194580 A1 | 7/2017 | Lee | |
| 2017/0358762 A1 | 12/2017 | Min et al. | |
| 2018/0358567 A1 | 12/2018 | Min et al. | |
| 2020/0144523 A1 | 5/2020 | Min et al. | |
| 2021/0296601 A1 | 9/2021 | Min et al. | |
| 2021/0311525 A1* | 10/2021 | Seo | H04M 1/0268 |
| 2023/0071578 A1* | 3/2023 | Sim | B32B 15/09 |

FOREIGN PATENT DOCUMENTS

| | | |
|---|---|---|
| JP | 2014-519626 | 8/2014 |
| JP | 2014-161009 | 9/2014 |
| JP | WO2015/178391 | 4/2017 |
| JP | 2017-219848 | 12/2017 |
| JP | 2020-52265 | 4/2020 |
| KR | 10-2013-0042051 | 4/2013 |
| KR | 10-2016-0144912 | 12/2016 |
| KR | 10-2017-0064160 | 6/2017 |
| KR | 10-2018-0104013 | 9/2018 |
| KR | 10-2020-0034333 | 3/2020 |

OTHER PUBLICATIONS

Japanese Office Action dated Dec. 12, 2023 issued in Application No. 2023-506562.
Extended European Search Report dated Aug. 21, 2024 issued in Application No. 21852991.5.

* cited by examiner

ELASTIC MEMBER AND DISPLAY DEVICE INCLUDING SAME

CROSS-REFERENCE TO RELATED PATENT APPLICATIONS

This application is a U.S. National Stage Application under 35 U.S.C. § 371 of PCT Application No. PCT/KR2021/009523, filed Jul. 23, 2021, which claims priority to Korean Patent Application No. 10-2020-0097353, filed Aug. 4, 2020, whose entire disclosures are hereby incorporated by reference.

TECHNICAL FIELD

The embodiment relates to an elastic member and a display device including the same.

BACKGROUND ART

Recently, there is an increasing demand for a flexible or foldable display device capable of easily carrying various applications and displaying an image on a large screen when being carried.

Such a flexible or foldable display device is folded or partially bent when being carried or stored, and may be implemented with the display unfolded when displaying images. Accordingly, an image display region may be increased, and a user may easily carry the display.

After the flexible or foldable display device is folded or bent, a restoration process of unfolding the flexible display device again may be repeated.

That is, since the flexible or foldable display device repeats folding and unfolding operations, the substrate of the flexible display device requires predetermined strength and elastic force, and cracks or deformation should not occur in the substrate during folding and restoration.

Meanwhile, a display substrate, which is an elastic member constituting a flexible or foldable display device, may be subjected to a pretreatment process of rolling the substrate for flexible or foldable characteristics.

Surface roughness may be formed on the surface of the elastic member by this rolling process, and depending on the direction in which the surface roughness is formed, the elastic member may have different physical properties depending on the direction.

Accordingly, there is a need for an elastic member having a new structure capable of securing folding characteristics and reliability in an elastic member having different physical characteristics depending on the direction.

DISCLOSURE

Technical Problem

An embodiment is directed to providing an elastic member having improved folding characteristics and reliability.

Technical Solution

An elastic member including a first area and a second area, the elastic member comprising: wherein the elastic member has a surface roughness in the longitudinal direction, wherein the first area is defined as a folding area, the second area is defined as an unfolding area, wherein a first pattern part having a long direction and a short direction is formed in a first area of the elastic member, wherein the long direction of the first pattern part and a longitudinal direction of the surface roughness are different from each other.

Advantageous Effects

In the elastic member according to the embodiment, a hole-shaped or groove-shaped pattern part formed on the elastic member may be formed along a longitudinal direction of surface roughness of the elastic member.

In detail, a long direction of the pattern part may be formed in a direction different from the longitudinal direction of the surface roughness. That is, the long direction of the pattern part may be disposed closer to a vertical direction than a horizontal direction with respect to the longitudinal direction of the surface roughness.

Accordingly, it is possible to improve folding characteristics that may occur due to a difference in physical characteristics due to a direction perpendicular to the rolling direction of the roller formed on the surface of the elastic member through the rolling process.

That is, since the long direction of the pattern part is formed close to the direction perpendicular to the longitudinal direction of the surface roughness, which is a direction similar to the vertical direction, surfaces remaining on the elastic member after forming the pattern part may be surface in the direction of movement of the roller than surfaces in the vertical direction.

Accordingly, since the surface in the rolling direction of the roller having a large resilience coefficient remains more than the surface in the vertical direction, plastic deformation due to stress generated when the elastic member is folded or restored may be minimized.

Accordingly, since plastic deformation occurring when the elastic member is folded can be minimized, folding characteristics and reliability of the elastic member can be improved.

MODES OF THE INVENTION

Hereinafter, preferred embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced. In addition, unless expressly otherwise defined and described, the terms used in the embodiments of the present invention (including technical and scientific terms) may be construed the same meaning as commonly understood by one of ordinary skill in the art to which the present invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected" or "coupled" to another element, it may include not only when the element is directly "connected" or "coupled" to other elements, but also when the element is "connected" or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an elastic member according to an embodiment will be described with reference to the drawings.

Figure 1:
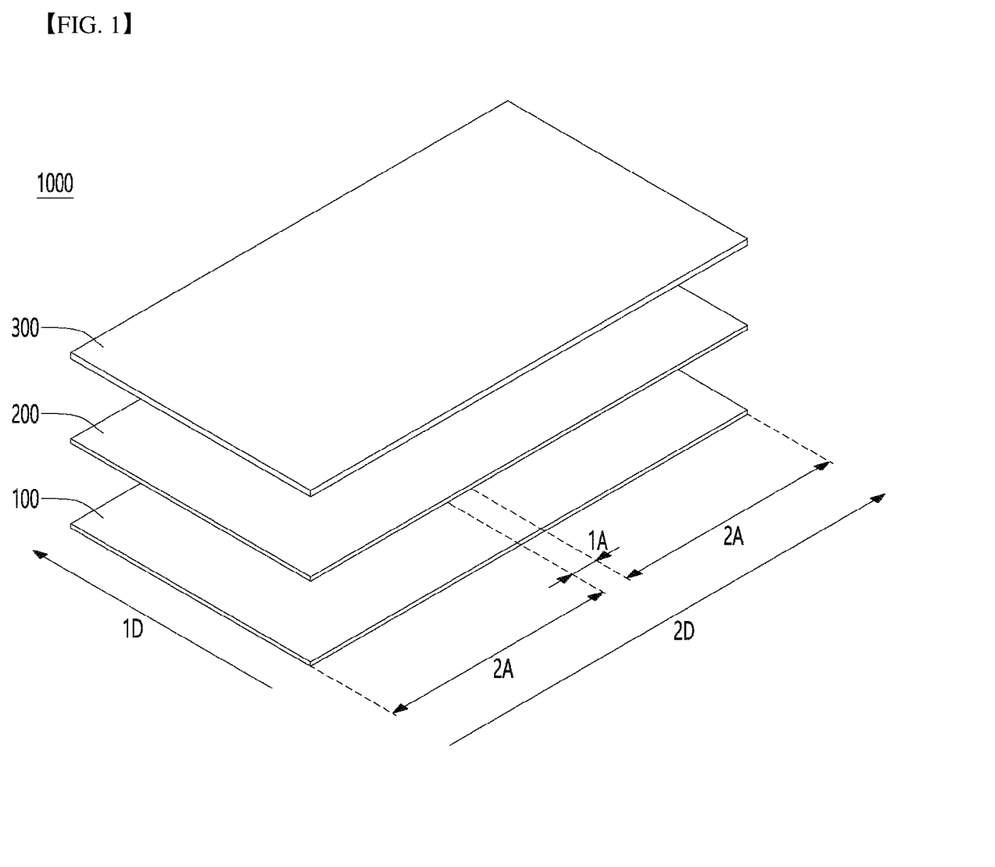
FIG. 1 is a view illustrating a perspective view of an elastic member according to an embodiment.

FIG. 1 is a perspective view of a display device including an elastic member according to an embodiment. the display device according to the embodiment may be a flexible display device or a foldable display device capable of being bent in one direction.

Referring to FIG. 1, the display device 1000 according to the embodiment includes the elastic member 100, a display panel 200 disposed on the elastic member 100, and a touch panel 300 disposed on the display panel 200.

The elastic member 100 may support the display panel 200 and the touch panel 300. That is, the elastic member 100 may be a support substrate supporting the display panel 200 and the touch panel 300.

Meanwhile, the touch panel 300 may be integrally formed with the display panel 200. For example, the touch panel 300 may be integrally formed with the display panel 200 in an on-cell or in-cell manner.

The elastic member 100 may include a metal material. For example, the elastic member 100 may include metal, metal alloy, plastic, a composite material (e.g., carbon fiber reinforced plastic, a magnetic or conductive material, a glass fiber reinforced material, etc.), ceramic, sapphire, glass, and the like. For example, the elastic member 100 may include stainless steel SUS.

The elastic member 100 may be formed as a single layer or as a multilayer including a plurality of layers.

The elastic member 100 may be flexible or foldable. That is, the elastic member 100 may be folded or bent in one direction. That is, the elastic member 100 may be a substrate for display applied to a flexible display device or a foldable display device.

The elastic member 100 may be defined in a first direction 1D and a second direction 2D that is different from the first direction 1D. For example, the first direction 1D may be defined as the same direction as the folding axis direction of the elastic member 100, and the second direction may be a direction perpendicular to the first direction.

Any one of the first direction 1D and the second direction 2D may be defined as a width direction of the elastic member 100, and the other direction may be defined as a longitudinal direction of the elastic member 100.

The elastic member 100 may be folded using any one of a width direction and a longitudinal direction of the elastic member 100 as a folding axis.

Hereinafter, for convenience of description, the first direction is defined as the same direction as the folding axis. In addition, the first direction is defined as a width direction of the elastic member 100, and the second direction is defined as a longitudinal direction of the elastic member 100.

The elastic member 100 may include at least two areas. In detail, the elastic member 100 may include a first area 1A and a second area 2A.

The first area 1A may be defined as an area where the elastic member 100 is folded. That is, the first area 1A may be a folding area.

In addition, the second area 2A may be defined as an area where the elastic member 100 is not folded. That is, the second area 2A may be an unfolding area.

The first area 1A and the second area 2A will be described in detail below.

The display panel 200 may be disposed on the elastic member 100.

The display panel 200 may include a plurality of pixels including a switching thin film transistor, a driving thin film transistor, a power storage device, and an organic light-emitting diode (OLED). In case of the OLED, deposition may be performed at a relatively low temperature, and the OLED may be mainly applied to a flexible display device for reasons such as low power and high luminance. Here, a pixel refers to a minimum unit for displaying an image, and the display panel displays an image through a plurality of pixels.

The display panel 200 may include a substrate, a gate line disposed on the substrate, a data line crossing with the gate line in isolation, and a common power line. In general, one pixel may be defined by the gate line, the data line, and the common power line as a boundary.

The substrate may include a material having flexible properties such as a plastic film, and the display panel 200 may be implemented by disposing an organic light-emitting diode and a pixel circuit on a flexible film.

The touch panel 300 may be disposed on the display panel 200. The touch panel 300 may implement a touch function in the flexible display device, and the touch panel may be omitted in the foldable display device that simply displays an image without the touch function.

The touch panel 300 may include a substrate and a touch electrode disposed on the substrate. The touch electrode may sense a position of an input device that is touched on the foldable of flexible display device using a capacitance type or a resistive film type.

The substrate of the touch panel 300 may include a material having flexible properties such as a plastic film, and the touch panel 300 may be implemented by disposing the touch electrode on the flexible film.

As described above, when the touch panel 300 is integrally formed with the display panel 200, the substrate of the touch panel 300 may be a substrate of the display panel or a part of the display panel. Accordingly, the touch panel 300 and the display panel 200 can be integrally formed, and the thickness of the display device can be reduced.

Meanwhile, the elastic member 100 and the display panel 200 may have different sizes.

For example, the area of the elastic member 100 may be 90% or more to 110% or less of the area of the display panel 200. In detail, the area of the elastic member 100 may be 95% or more to 105% or less of the area of the display panel 200. In more detail, the area of the elastic member 100 may be 97% or more to 100% or less of the area of the display panel 200.

When the area of the elastic member 100 is 90% or less of the area of the display panel 200, the supporting force of the elastic member 100 to support the display panel 200 or the touch panel 300 may be reduced, whereby a curl may occur in the unfolding area of the elastic member 100. Accordingly, when the user visually recognizes the screen area, visibility may decrease, and when the touch is driven, a touch malfunction may occur because the screen of the touch area is incomplete due to the curl area.

An addition, when the area of the elastic member 100 is greater than 110% of the area of the display panel 200, a supporting force for supporting the display panel or the touch panel by the elastic member 100 may be secured, but a bezel area of a display device including the substrate, the display panel, and the touch panel may increase. As a result, since the screen area available to the user cannot be widened, it may cause inconvenience in using the display device.

Meanwhile, although not shown in the drawings, a cover window for protecting the foldable display device or the flexible display device may be additionally disposed on the touch panel 300 or the display panel 200 (when the touch panel is omitted).

Meanwhile, the elastic member 100, the display panel 200, and the touch panel 300 may be adhered to each other by an adhesive layer or the like.

As described above, the display device includes the elastic member 100.

Figure 2:
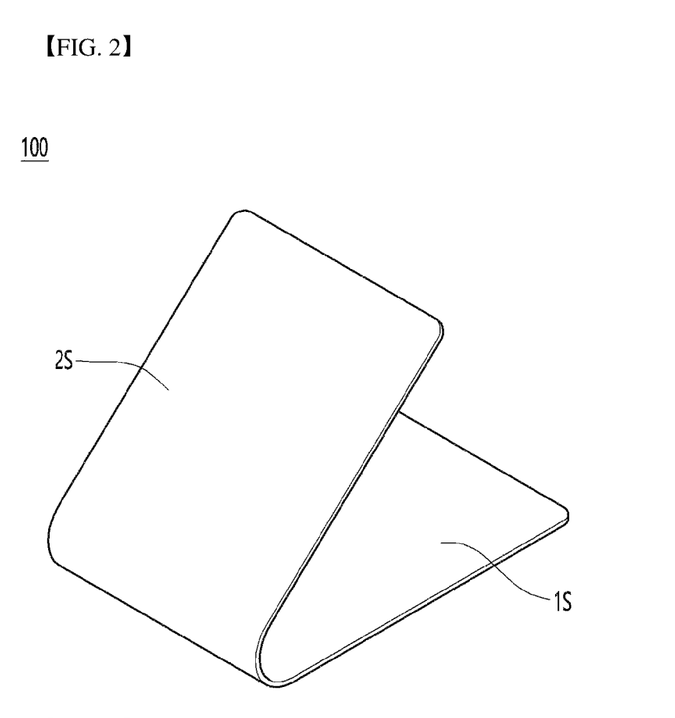
FIG. 2 is a view illustrating a perspective view of an elastic member according to the embodiment.

Referring to FIG. 2, the elastic member 100 may be bent in one direction.

In detail, the elastic member 100 may include a first surface 1S and a second surface 2S opposite to the first surface 1S. In the elastic member 100, the first surface 1S or the second surface 2S may be bent to face each other. That is, a surface on which the panels are disposed may be bent to face each other, or a surface opposite to the surface on which the panels are disposed may be bent to face each other.

However, the embodiment is not limited thereto, and the second surface and the first surface of the elastic member 100 may be bent to alternately face each other. That is, the elastic member 100 may include a plurality of first areas and a plurality of second areas.

In the following description, as shown in FIG. 2, it will be mainly described that the first surfaces 1S are bent in a direction facing each other in the elastic member 100.

As described above, the first area 1A and the second area 2A may be defined in the elastic member 100. The first area 1A and the second area 2A may be areas defined when the first surfaces 1S are bent in the direction facing each other in the elastic member 100.

In detail, the elastic member 100 is bent in one direction, and the elastic member 100 may be divided into the first area 1A which is a folded area (folding area) and the second area 2A which is a unfolded area (unfolding area).

Figure 3:
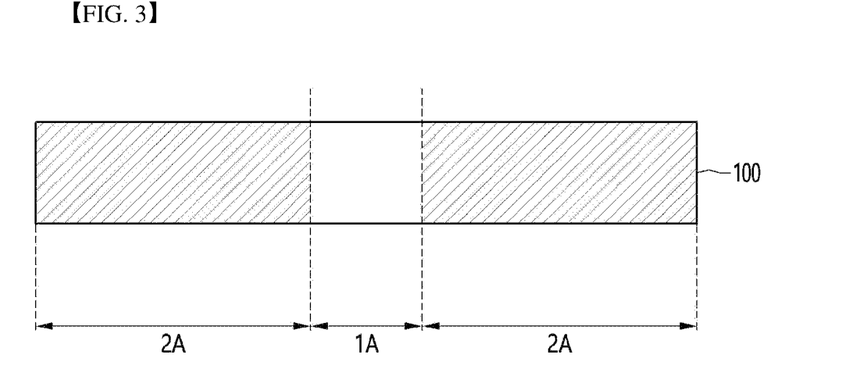
FIG. 3 is a view illustrating a side view of an elastic member according to the embodiment before folding.
Figure 4:
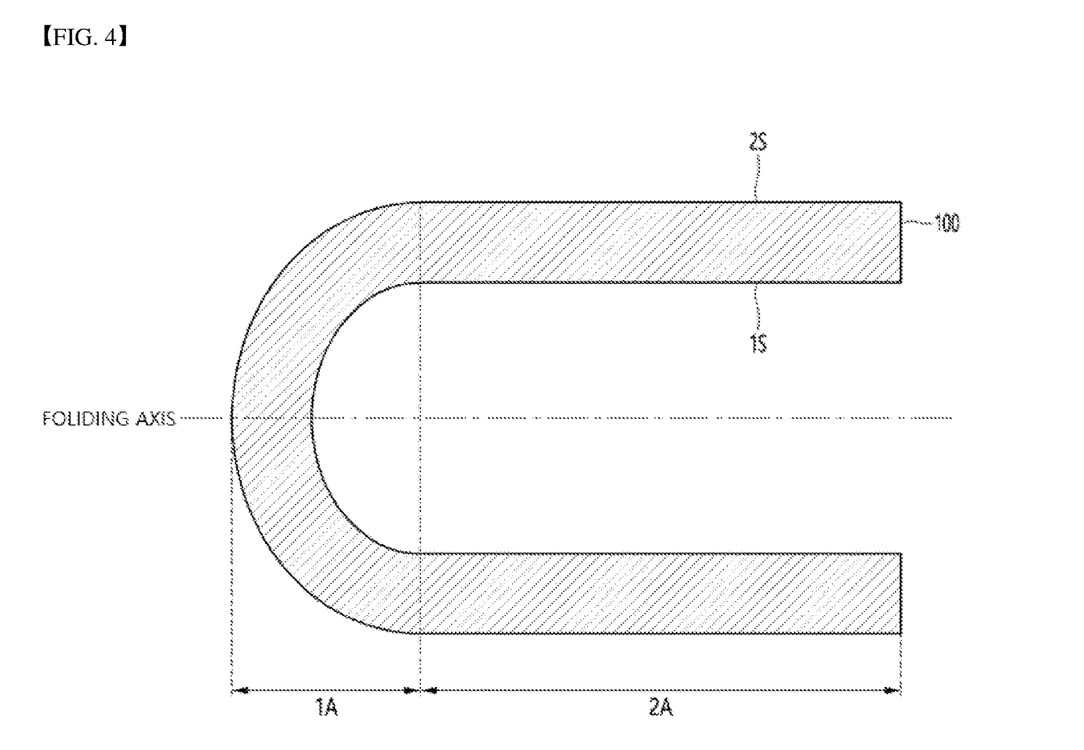
FIG. 4 is a view illustrating a side view of the elastic member according to the embodiment after folding.

Referring to FIG. 3 and FIG. 4, the elastic member 100 may include the first area 1A that is an area where the elastic member 100 is bent. The elastic member 100 may include the second area 2A that is not bent and is disposed adjacent to the first area 1A.

For example, the second area 2A may be formed on the left side and the right side of the first area 1A based on the direction in which the elastic member 100 is bent. That is, the second area 2A may be disposed at both ends of the first area 1A. That is, the first area 1A may be disposed between the second areas 2A.

However, the embodiment is not limited thereto, and the first area 1A may be further formed outside the second area 2A.

The first area 1A and the second area 2A may be formed on the same elastic member 100. That is, the first area 1A and the second area 2A may be formed integrally with each other without being separated on the same elastic member 100.

Sizes of the first area 1A and the second area 2A may be different from each other. In detail, the size of the second area 2A may be larger than the size of the first area 1A.

In addition, the area of the first area 1A of the elastic member 100 may be 1% or more to 30% or less of the total area of the elastic member 100. In detail, the area of the first area 1A of the elastic member 100 may be 5% or more to 20% or less of the total area of the elastic member 100. The area of the first area 1A of the elastic member 100 may be 10% or more to 15% or less of the total area of the elastic member 100.

When the area of the first area 1A of the elastic member 100 is less than 1% of the total area of the substrate 100, when folding and restoring the elastic member is repeated, a crack may be formed on a boundary surface between the folding area and the unfolding area, whereby folding reliability of the elastic member 100 may be reduced.

In addition, when the area of the first area 1A of the elastic member 100 exceeds 30% of the total area of the elastic member 100, when the elastic member is folded, a curl may occur in the folding area of the display panel 200. Accordingly, when the user visually recognizes the screen area, visibility may decrease, and when the touch is driven, a touch malfunction may occur because the screen of the touch area is incomplete due to the curl area.

Although the drawing shows that the first area 1A is positioned at the central portion of the elastic member 100, the embodiment is not limited thereto. That is, the first area 1A may be located at one end and an end region of the elastic member 100. That is, the first area 1A may be positioned at one end and an end region of the elastic member 100 so that the size of the first area 1A is asymmetrical.

FIG. 4 is a side view of the elastic member after the elastic member is folded.

Referring to FIG. 4, the elastic member 100 may be folded in one direction around a folding axis. In detail, the first surface 1S may be folded in a direction facing each other along the folding axis.

As the elastic member 100 is folded in one direction, the first area 1A and the second area 2A may be formed on the elastic member 100. That is, the folding area formed by folding the elastic member 100 in one direction and the unfolding area positioned at both ends of the folding area may be formed in the elastic member 100.

The folding area may be defined as an area where a curvature R is formed, and the unfolded area may be defined as an area where the curvature R is not formed or the curvature is close to zero.

Referring to FIGS. 3 and 4, the elastic member 100 may be folded in one direction, and may be formed in the order of the unfolding area, the folding area, and the unfolding area.

A plurality of pattern parts for reducing and dispersing stress generated when the elastic member 100 is folded may be formed in at least one of the first area 1A and the second area 2A. The pattern parts will be described in detail below.

Meanwhile, although FIG. 4 illustrates that the first surfaces 1S of the elastic member 100 are folded to face each other, the embodiment is not limited thereto, and the second surfaces 2S may be folded to face each other.

Hereinafter, the elastic member according to various embodiments will be described in detail with reference to the drawings.

Figure 5:
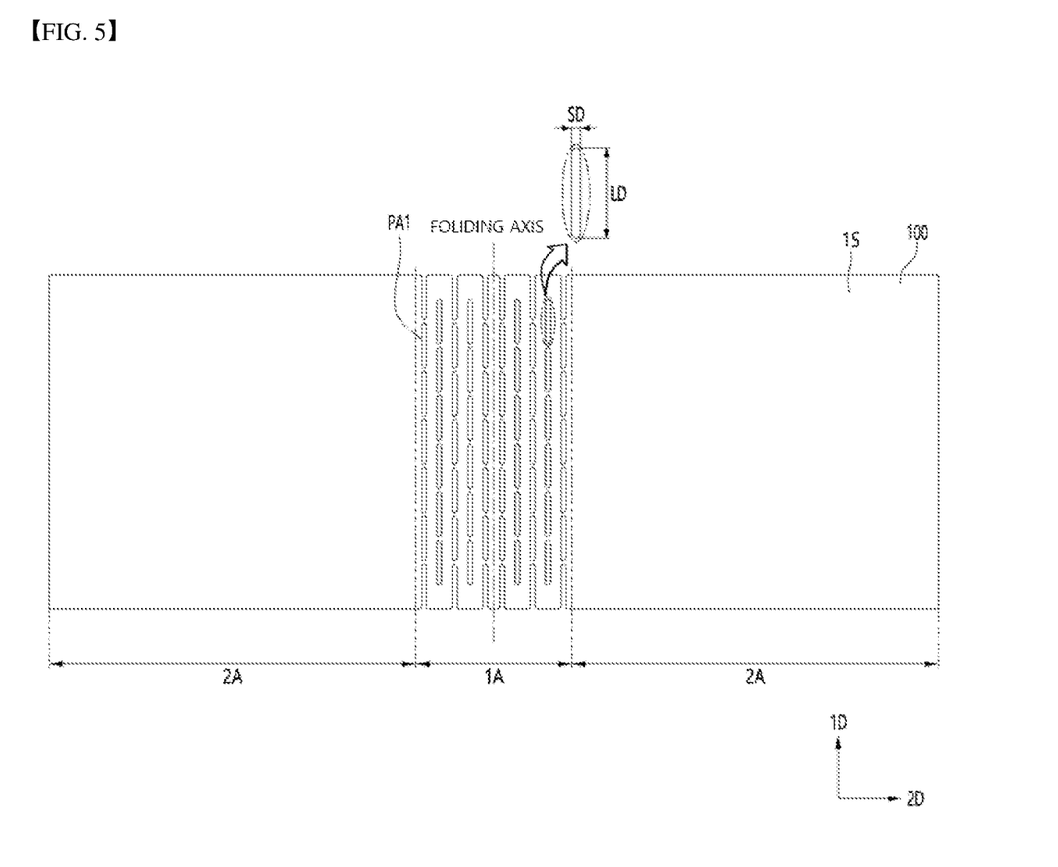
FIG. 5 is a view illustrating a top view of a first surface of the elastic member according to the embodiment.
Figure 6:
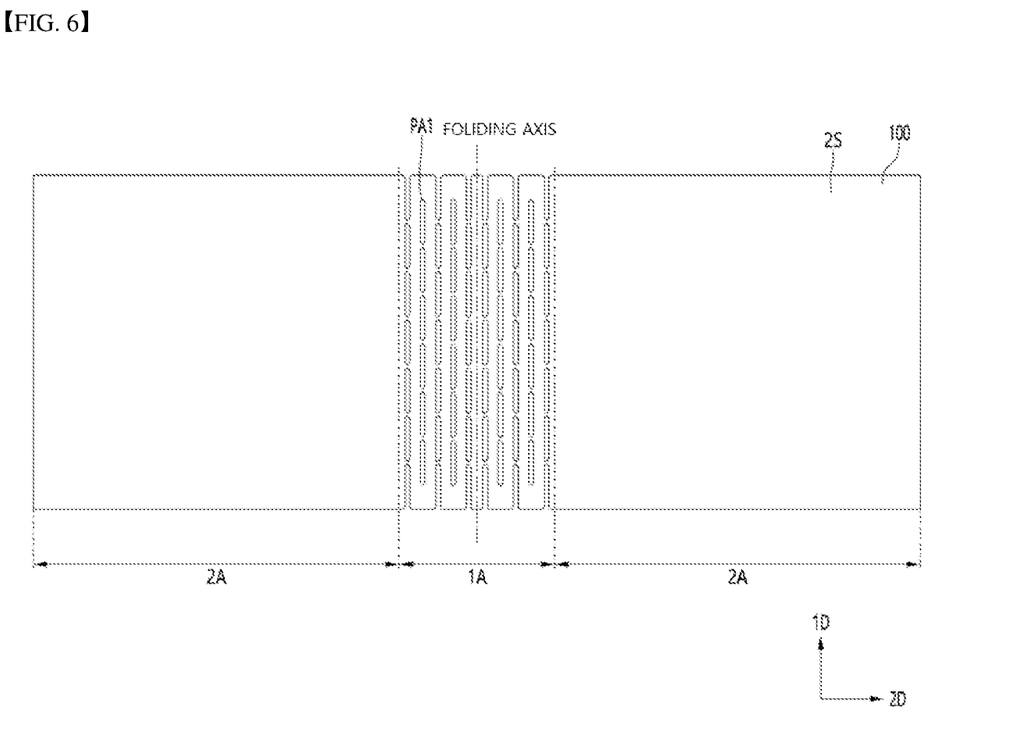
FIG. 6 is a view illustrating a top view of a second surface of the elastic member according to the embodiment.

FIGS. 5 and 6 are top views of the elastic member according to the embodiment. In detail, FIG. 5 is a top view of the first surface 1S of the elastic member 100, and FIG. 6 is a top view of the second surface 2S of the elastic member 100.

Referring to FIGS. 5 and 6, the elastic member according to the embodiment may include a plurality of pattern parts PA. In detail, the elastic member 100 may include a first pattern part PA1 disposed in the first area 1A.

The first pattern part PA1 may be formed in a hole or groove shape.

In detail, the first pattern part PA1 may be formed in a hole shape penetrating the first surface 1S and the second surface 2S of the elastic member, or may be formed in a groove shape formed in the first surface 1S or the second surface 2S.

When the elastic member 100 is folded, the first pattern part PA1 disposed in the first area 1A, which is an area in which the elastic member is folded, may facilitate folding of the elastic member 100. In detail, since the thickness of the elastic member 100 is reduced in an area where the elastic member is folded by the first pattern part PA1, and thus compressive stress is reduced, the elastic member 100 can be easily folded.

Meanwhile, in the first area 1A where the elastic member 100 is folded, compressive stress and tensile stress generated in the process of folding and restoration the elastic member are greater than those in the second area 2A, whereby in the process of folding and restoration the elastic member 100, plastic deformation due to stress may occur in the first area 1A.

The elastic member 100 according to the embodiment adjusts the shape of the first pattern part PA1 disposed in the first area 1A according to the direction of the surface roughness formed on the surface of the elastic member 100 to minimize plastic deformation occurring in the first area 1A, whereby plastic deformation occurring in the first area 1A may be minimized.

In detail, the first pattern part PA1 may be formed in a shape having a long direction (LD) and a short direction (SD).

For example, referring to FIG. 5, the first pattern part PA1 may be formed in a shape having a long direction LD and a short direction SD extending in a direction perpendicular to the long direction LD.

The folding axis of the elastic member 100 may be formed in a direction corresponding to the long direction LD of the first pattern part PA1.

The extension directions of the long direction LD and the short direction (SD) of the first pattern part PA1 may be related to the surface roughness formed on the surface of the elastic member 100.

A surface roughness may be formed on the elastic member 100. That is, surface roughness is formed on at least one of the first surface 1S and the second surface 2S of the elastic member 100, and accordingly, the surface of the elastic member 100 may have a surface roughness.

The surface roughness formed on the elastic member 100 may be formed in a specific direction.

The surface roughness of the elastic member 100 may be formed during a pretreatment process of the elastic member 100.

In detail, the elastic member 100 is pre-treated before forming the first pattern part 100. For example, before forming the first pattern part PA1 in the first area 1A of the elastic member 100, a rolling process may be performed to reduce the thickness of the elastic member and increase tensile force and hardness. For example, a cold rolling process may be performed before the first pattern part PA1 of the elastic member 100 is formed.

Figure 7:
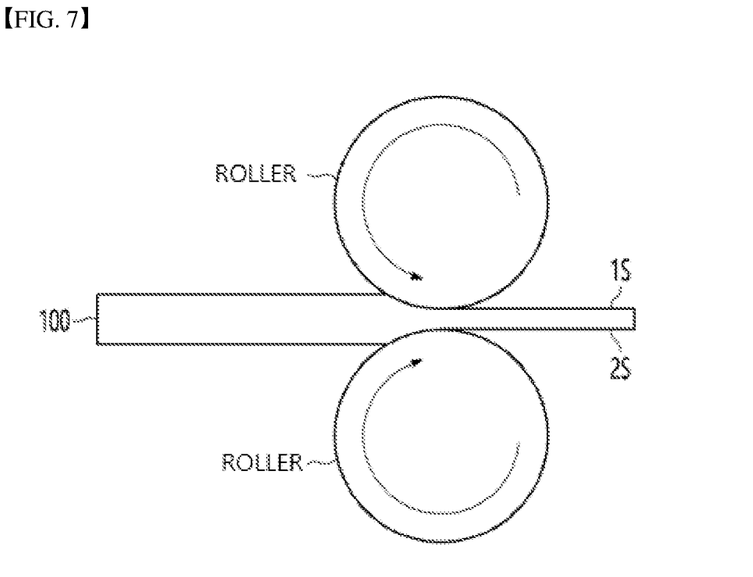
FIG. 7 is a view for explaining that a rolling process is performed on the elastic member according to the embodiment.

Referring to FIG. 7, the cold rolling process may be performed on the elastic member while passing the elastic member at a low temperature between two rotating rollers. The elastic member 100 on which the cold rolling process is completed may reduce the thickness of the elastic member 100, and may improve tensile force and hardness of the elastic member 100. Accordingly, when the elastic member 100 is applied to a flexible or foldable display device, folding characteristics may be improved.

In this case, surface roughness may be formed on the first surface 1S and second surfaces 2S of the elastic member 100 in contact with the roller by pressure and/or friction applied to the elastic member 100 during the cold rolling process. Accordingly, surface roughness formed in a specific direction may be formed on the first surface 1S and the second surface 2S of the elastic member 100.

Figure 8:
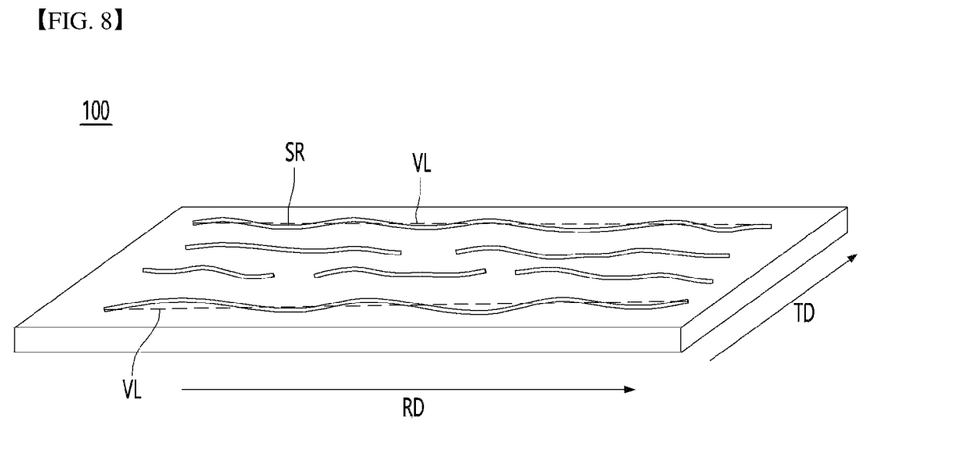
FIG. 8 is a view for explaining a direction of surface roughness formed on the elastic member according to the embodiment.

That is, as shown in FIG. 8, a plurality of surface roughness SR extending from a start point where the surface roughness starts to a direction of an end point may be formed on the first surface 1S and the second surface 2S of the elastic member 100.

That is, the surface roughness having a longitudinal direction in a specific direction may be formed on the surface of the elastic member 100. Here, the longitudinal direction SRD of the surface roughness may be defined as a longitudinal direction of a virtual line VL connecting the end point from the start point of the surface roughness. Alternatively, when the longitudinal directions of the surface roughness include a plurality of directions similar to each other, the longitudinal directions of the surface roughness may be defined as average directions of the plurality of directions.

The longitudinal direction SRD of the surface roughness may be changed by the rolling process. In detail, the longitudinal direction SRD of the surface roughness may be formed in a direction corresponding to the rolling direction RD of the roller. That is, the longitudinal direction SRD of the surface roughness may be formed in a direction equal to or close to the rolling direction RD of the roller.

In addition, the longitudinal direction SRD of the surface roughness may be different from a vertical direction TD perpendicular to the rolling direction RD of the roller. That is, the longitudinal direction SRD of the surface roughness may be perpendicular to or close to the vertical direction TD.

The shape of the first pattern part PA1 described above may vary according to the longitudinal direction of the surface roughness formed on the elastic member 100.

In detail, the first pattern part PA1 formed in the first area 1A may have a long direction LD and a short direction SD, and a long direction LD of the first pattern part PA1 may extend in a direction different from a longitudinal direction SRD of the surface roughness. That is, the longitudinal direction LD of the first pattern part may not be parallel to the longitudinal direction SRD of the surface roughness.

Figure 9:
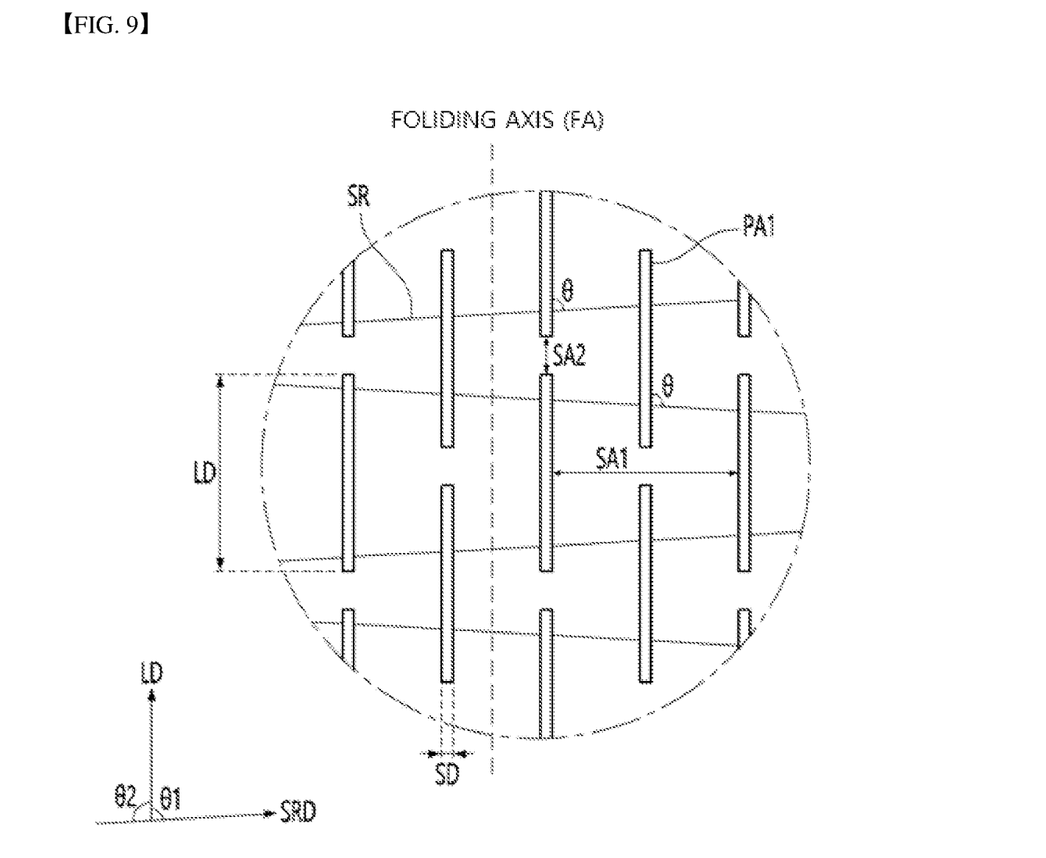
FIG. 9 is a view illustrating an enlarged view of one region of an elastic member according to the embodiment.

FIG. 9 is an enlarged view of one area of FIG. 5.

Referring to FIG. 9, the first pattern part PA1 may have the long direction LD and the short direction SD. The first pattern part PA1 may have a longitudinal direction in the long direction LD and a width direction in the short direction SD.

The long direction LD and the short direction SD of the first pattern part PA1 may extend in a direction perpendicular to each other. In detail, the long direction LD of the first pattern part PA1 may be defined as a direction corresponding to a folding axis FA direction of the elastic member 100, and the short direction SD of the first pattern part PA1 may extend in a direction perpendicular to the folding axis direction and the longitudinal direction LD.

Referring to FIG. 9, a long direction LD of the first pattern part PA1 may be different from a longitudinal direction SRD of the surface roughness. That is, the long direction LD of the first pattern part PA1 may not be parallel to the longitudinal direction SRD of the surface roughness. That is, an angle θ between the long direction LD of the first pattern part PA1 and the longitudinal direction SRD of the surface roughness may be 50° or more. In detail, the angle θ between the long direction LD of the first pattern part PA1 and the longitudinal direction SRD of the surface roughness may be 50° to 130°. That is, an acute angle θ1 in the long direction LD of the first pattern part PA1 and the longitudinal direction SRD of the surface roughness may be 50° to 90°, and an obtuse angle θ2 in the long direction LD of the first pattern part PA1 and the longitudinal direction SRD of the surface roughness may be 90° to 130°.

Accordingly, an angle between the folding axis FA direction of the elastic member 100 and the longitudinal direction of the surface roughness may be 50° to 130°.

In more detail, the angle θ between the long direction LD of the first pattern part PA1 and the longitudinal direction SRD of the surface roughness may be 60° to 120°. In more detail, an angle θ between the long direction LD of the first pattern part PA1 and the longitudinal direction SRD of the surface roughness may be 70° to 110°. In more detail, an angle θ between the long direction LD of the first pattern part PA1 and the longitudinal direction SRD of the surface roughness may be 80° to 100°.

That is, the long direction LD of the first pattern part PA1 may be formed closer to a direction perpendicular to the longitudinal direction SRD of the surface roughness than a horizontal direction.

When a rolling process is performed before the pattern parts of the elastic member 100 are formed, a surface of the elastic member 100 may have surface roughness, and the elastic member 100 may have different physical characteristics according to the longitudinal direction of the surface roughness.

For example, when the rolling process proceeds in the second direction 2A of the elastic member 100, that is, when the rolling direction of the roller proceeds in the second direction 2A of the elastic member 100, the longitudinal direction of surface roughness formed on the first surface or second surface of the elastic member 100 may be parallel to or close to the second direction 2A.

That is, the rolling direction RD of the roller may be formed equal to or close to the second direction 2A, and the vertical direction may be formed equal to or close to the first direction 1A.

In this case, the physical characteristics of the elastic member 100 may be changed in the second direction 2A similar to the rolling direction RD of the roller and the first direction 1A similar to the vertical direction TD. In detail, the elastic member 100 may have an elastic modulus and a resilience coefficient different from each other in the first direction 1A and the second direction 2A.

The elastic modulus E refers to a degree of strain that occurs when an elastic material is stressed, and may be defined by Equation 1 below.

$$E(KN/mm^2)=\sigma/\varepsilon \qquad \text{[Equation 1]}$$

(Here, σ means yield strength, and ε means unit strain.)

In addition, the elastic modulus refers to the strain energy per unit volume required to increase the stress to the yield point, and can be defined by Equation 2 below.

$$U_r = \int_0^{\varepsilon_y} \sigma d\varepsilon = \frac{1}{2}\sigma_y\varepsilon_y = \frac{\sigma_y^2}{2E} \qquad \text{[Equation 2]}$$

That is, referring to Equation 2, it can be seen that the greater the yield strength and the smaller the elastic modulus, the greater the resilience coefficient.

The elastic modulus of the elastic member 100 for which the cold rolling process has been completed is smaller in the rolling direction RD of the roller than in the vertical direction TD. Accordingly, the resilience coefficient calculated by the elastic modulus and yield strength may have a rolling direction RD of the roller greater than a vertical direction TD.

Thai is, after the first pattern part is formed on the elastic member 100, a first residual area SA1 in the rolling direction RD of the roller or the longitudinal direction of the elastic member and a second residual area SA2 in the vertical direction TD or the width direction of the elastic member 100 may remain in the elastic member.

At this time, the surface remaining after the first pattern part is formed on the elastic member 100 may withstand the same stress for a long time as the more surfaces in the rolling direction RD of the roller remain.

Therefore, in the elastic member according to the embodiment, the long direction of the first pattern part is formed in a direction different from the longitudinal direction of the roughness corresponding to or similar to the rolling direction RD of the roller, so that a large amount of residual surface in the rolling direction RD of the roller remains, and thereby, when the elastic member is folded, plastic deformation of the elastic member due to compressive or tensile stress may be minimized.

Accordingly, the elastic member according to the embodiment may improve folding characteristics and folding reliability.

This invention will be described in more detail below through the measurement of yield strength, elastic modulus, and resilience coefficient according to the rolling direction of the roller of elastic member and vertical direction of elastic member according to embodiments. These embodiments are merely examples for describing the present invention in more detail. Therefore, the present invention is not limited to these embodiments.

Example 1

A cold rolling process was performed by passing SUS 301EH between two rollers.

Then, the yield strength, the elastic modulus and the resilience coefficient of the SUS 301EH in the rolling direction RD and vertical direction TD of the roller were measured.

Example 2

After the cold rolling process was performed in the same manner as in Example 1 except that SUS 301FH was used, the yield strength, the elastic modulus and the resilience coefficient of the SUS 301EH in the rolling direction RD and vertical direction TD of the roller were measured.

Example 3

After the cold rolling process was performed in the same manner as in Example 1 except that SUS 316HN1 was used, the yield strength, the elastic modulus and the resilience coefficient of the SUS 301EH in the rolling direction RD and vertical direction TD of the roller were measured.

Example 4

After the cold rolling process was performed in the same manner as in Example 1 except that SUS 316L was used, the yield strength, the elastic modulus and the resilience coefficient of the SUS 301EH in the rolling direction RD and vertical direction TD of the roller were measured.

Example 5

After the cold rolling process was performed in the same manner as in Example 1 except that nickel silver was used, the yield strength, the elastic modulus and the resilience coefficient of the SUS 301EH in the rolling direction RD and vertical direction TD of the roller were measured.

ficient according to a roll pressing direction, that is, a rolling direction RD of the roller and the vertical direction TD.

That is, the yield strength of the elastic member according to Examples 1 to 5 may have a similar size in the rolling direction RD of the roller and the vertical direction TD.

In addition, it can be seen that the elastic modulus according to Examples 1 to 5 is smaller in the rolling direction RD of the roller than in the vertical direction TD.

In addition, it can be seen that the resilience coefficient according to Examples 1 to 5 is greater in the rolling direction RD of the roller than in the vertical direction TD.

That is, it can be seen that the resilience coefficient calculated by the yield strength and the elastic modulus is larger in the rolling direction RD of the roller having the smaller elastic modulus than in the vertical direction TD.

Therefore, if the rolling surface of the roller of the elastic member remains more than the vertical surface after forming the pattern part of the elastic member, the elastic member can withstand stress generated when folding the elastic member for a longer time, and thereby, it can be seen that the occurrence of plastic deformation can be minimized.

Figure 10:
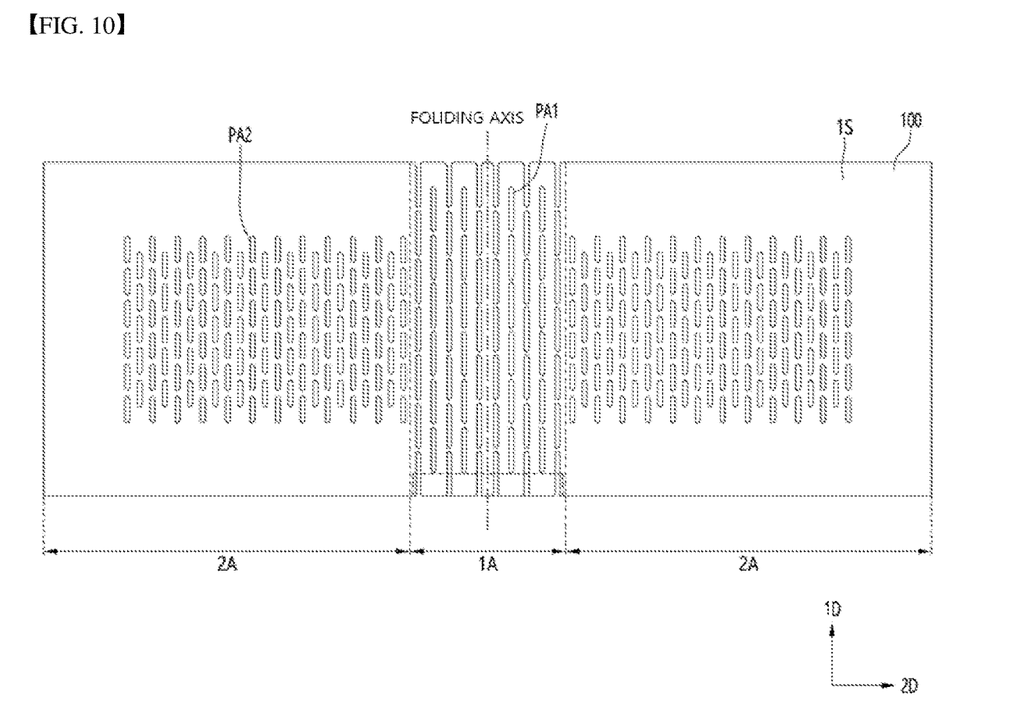
FIG. 10 is a view illustrating a top view of a first surface of the elastic member according to another embodiment.

Meanwhile, referring to FIG. 10, the elastic member according to another embodiment may further include a second pattern portion PA2 disposed in the second area 2A.

The second pattern part PA2 may be formed in a hole or groove shape.

In detail, the second pattern part PA2 may be formed in a hole shape penetrating the first surface 1S and the second surface 2S of the elastic member, or may be formed in a groove shape formed in the first surface 1S or the second surface 2S.

The second pattern part PA2 disposed in the second area 2A, which is an area in which the elastic member 100 is not folded, may maintain similar physical characteristics of the first area 1A and the second area 2A.

In detail, the difference in deformation due to heat from the first area 1A in which the first pattern part PA1 is disposed may be alleviated by the second pattern part PA1. That is, when heat is applied to the elastic member 100, the difference in deformation due to heat in the first area 1A and the second area 2A may be alleviated by forming a pattern part in both the first area 1A and the second area 2A. Accordingly, it is possible to prevent the elastic member 100 from being bent or distorted.

In addition, stress unevenness between the first area 1A and the second area 2A may be alleviated by the second pattern part PA2 formed in the second area 2A, and thereby, the bending of the elastic member 100 can be prevented.

When bonding a panel or the like by an adhesive layer on the elastic member 100, the adhesive material is disposed while filling the inside of the first pattern part PA1 of the

TABLE 1

|  | Example 1 | | Example 2 | | Example 3 | | Example 4 | | Example 5 | |
| --- | --- | --- | --- | --- | --- | --- | --- | --- | --- | --- |
| Rolling direction | RD | TD | RD | TD | RD | TD | RD | TD | RD | TD |
| Yield strength (kg/mm$^2$) | 208 | 218 | 132 | 132 | 140 | 126 | 130 | 145 | 81 | 79 |
| elastic modulus(kN/mm$^2$) | 216 | 257 | 194 | 216 | 173 | 204 | 194 | 248 | 140 | 162 |
| resilience coefficient | 100 | 92 | 45 | 40 | 57 | 39 | 44 | 42 | 23 | 19 |

Referring to Table 1, it may be seen that the elastic members according to Examples 1 to 5 have different the yield strength, the elastic modulus, and the resilience coefficient second area 2A and the second pattern part PA2 of the second area 2A together by the second pattern part PA2 formed in the second area 2A, and thereby, it is possible to prevent the adhesive layer from forming a step between the first area and the second area.

The second pattern part PA2 may be formed in the same or similar shape as the first pattern part PA1. In detail, the second pattern part PA2 is formed in a shape having a long direction and a short direction, the long direction of the second pattern part and the long direction of the first pattern part PA1 extend in the same or similar direction to each other, and the short direction of the second pattern part and the short direction of the first pattern part PA1 may extend in the same or similar direction.

Accordingly, in the second area 2A, the longitudinal direction of the second pattern part may be different from the longitudinal direction of the surface roughness, so that after the second pattern part is formed, the residual area of the elastic member remaining in the second area may have more surfaces of rolling direction of the roller than the vertical direction.

Accordingly, when the elastic member 100 is folded, plastic deformation occurring in the second area may be prevented.

In addition, the difference in the resilience coefficient in the first and second areas can be minimized by making the long and short directions of the pattern parts of the first area and the second area the same or similar to each other, and thereby, when the elastic member is folded, it is possible to minimize bending or deformation of the elastic member due to the difference in the resilience coefficient.

Hereinafter, various embodiments of the elastic member formed of a single layer or multiple layers will be described with reference to FIGS. 11 to 14.

FIGS. 11 to 14 are various cross-sectional views according to the layer structure of various elastic members according to the embodiment.

Figure 11:
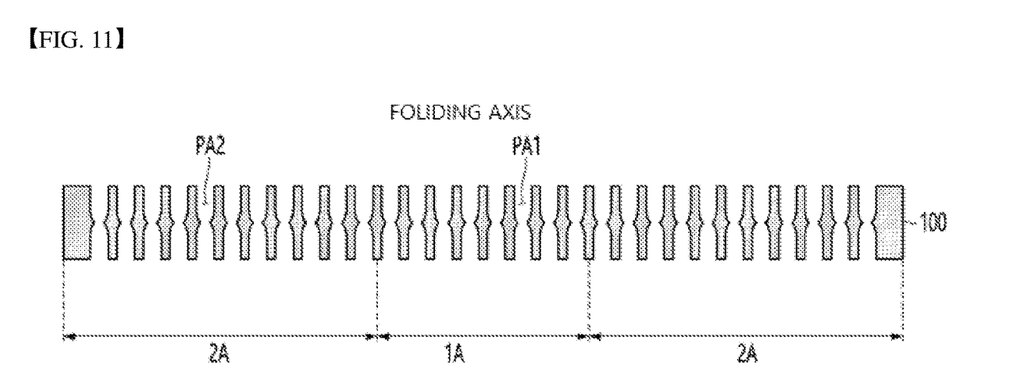
FIGS. 11 to 14 are views illustrating various cross-sectional views according to the layer structure of various elastic members according to the embodiment.

Referring to FIG. 11, the elastic member 100 may be formed as the single layer. In detail, the elastic member may be formed of the single layer including the metal material described above.

Also, the first pattern part PA1 and the second pattern part PA2 may be formed penetrating the elastic member 100.

Figure 12:
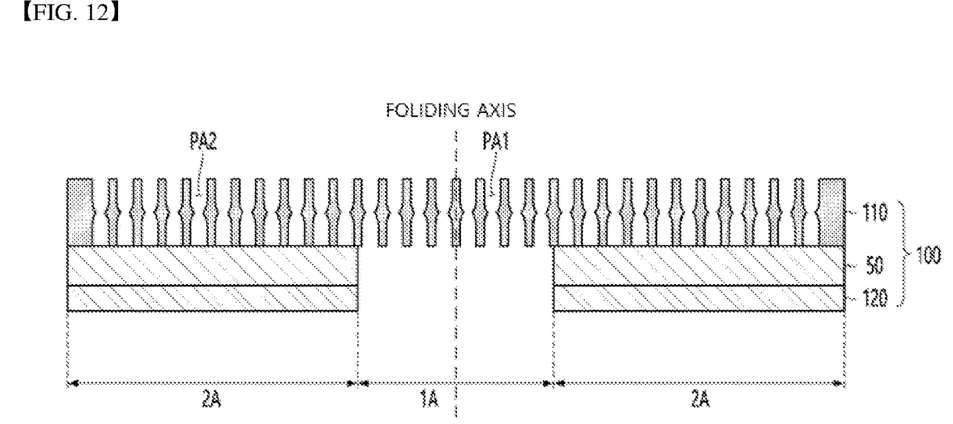
Figure 13:
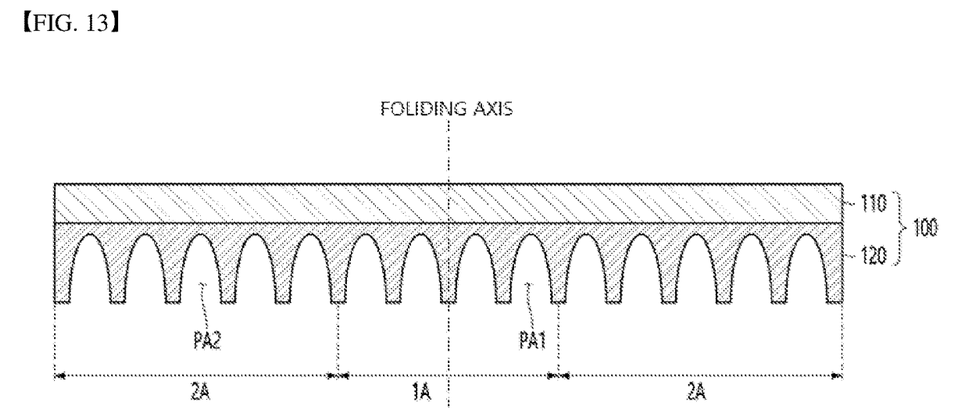
Figure 14:
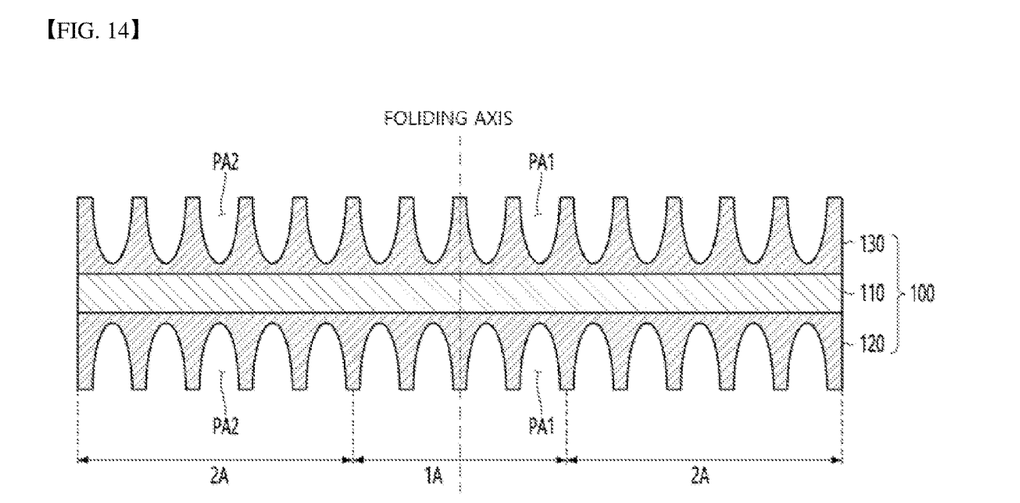

Referring to FIGS. 12 to 14, the elastic member 100 may be formed in multiple layers.

Referring to FIG. 12, the elastic member 100 may include a first layer 110 and a second layer 120. The first layer 110 and the second layer 120 may be adhered to each other by an adhesive layer 50.

The first layer 110 and the second layer 120 may include different materials. For example, the first layer 110 may have higher yield strength than the second layer 120, and the second layer 120 may have higher thermal conductivity than the first layer 110.

For example, the first layer 110 may include stainless steel SUS, and the second layer 120 may include copper. Accordingly, the second layer 120 may serve as a heat dissipation layer.

In addition, the first layer 110 and the second layer 120 may be formed to have different thicknesses. For example, a thickness of the first layer 110 may be greater than that of the second layer 120.

The first pattern part PA1 and the second pattern part PA2 may be formed on the first layer 110. That is, the first pattern part PA1 and the second pattern part PA2 may be formed through the first layer 110.

Referring to FIG. 13, the elastic member 100 may include the first layer 110 and the second layer 120. The first layer 110 and the second layer 120 may be disposed in direct contact with each other. For example, the first layer 110 and the second layer 120 may be manufactured in a clad manner so as to directly contact each other.

The first layer 110 and the second layer 120 may include different materials. For example, the first layer 110 may have higher yield strength than the second layer 120, and the second layer 120 may have higher thermal conductivity than the first layer 110.

For example, the first layer 110 may include stainless steel SUS, and the second layer 120 may include copper. Accordingly, the second layer 120 may serve as a heat dissipation layer.

In addition, the first layer 110 and the second layer 120 may be formed to have different thicknesses. For example, the thickness of the first layer 110 may be smaller than the thickness of the second layer 120.

The first pattern part PA1 and the second pattern part PA2 may be formed on the second layer 120. That is, the first pattern portion PA1 and the second pattern portion PA2 may be formed through the second layer 120.

Referring to FIG. 14, the elastic member 100 may include the first layer 110, the second layer 120, and a third layer 130. The first layer 110, the second layer 120, and the third layer 130 may be disposed in direct contact with each other. For example, the first layer 110, the second layer 120, and the third layer 130 may be manufactured in the clad manner so as to directly contact each other.

The first layer 110 may include a material different from that of the second layer 120 and the third layer 130. For example, the first layer 110 may have a higher yield strength than the second layer 120 and the third layer 130, and the second layer 120 and the third layer 130 may have higher thermal conductivity than that of the first layer 110.

For example, the first layer 110 may include stainless steel SUS, and the second layer 120 and the third layer 130 may include copper. Accordingly, the second layer 120 and the third layer 130 may serve as heat dissipation layers.

Also, the first layer 110 may be formed to have a different thickness from that of the second layer 120 and the third layer 130. For example, the thickness of the first layer 110 may be smaller than the thicknesses of the second layer 120 and the third layer 130.

The first pattern part PA1 and the second pattern part PA2 may be formed on the second layer 120 and the third layer 130. That is, the first pattern part PA1 and the second pattern part PA2 may be formed through the second layer 120 and the third layer 130.

Figure 15:
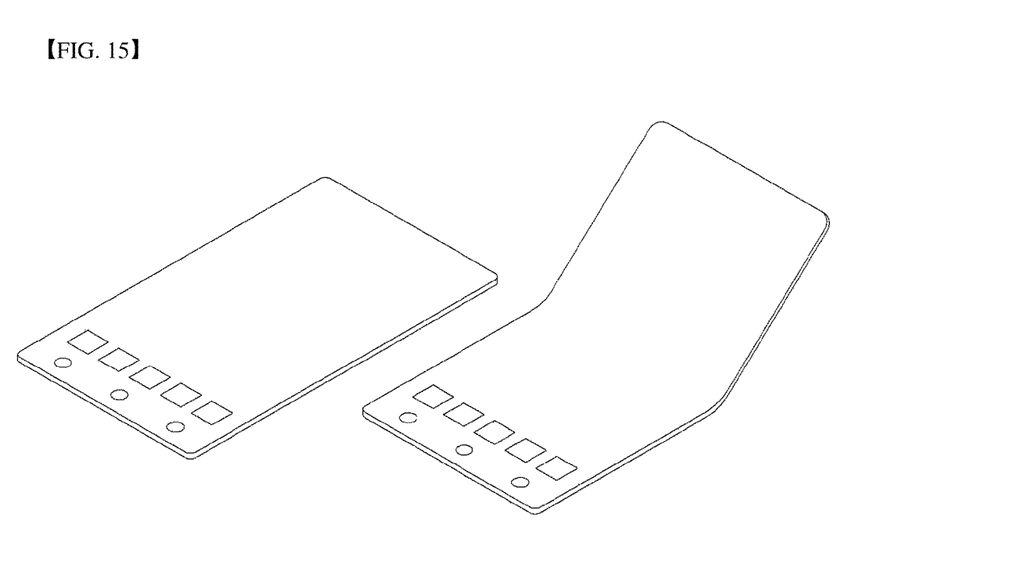
FIG. 15 is a view for describing an application example of an elastic member according to embodiments.

FIG. 15 is a view for explaining an example in which the elastic member according to embodiments is applied.

Referring to FIG. 15, the elastic member according to embodiments may be applied to a flexible or foldable display device displaying a display.

For example, the elastic member according to the embodiments may be applied to flexible display devices such as mobile phones and tablets.

Such the elastic member may be applied to the flexible display device such as a mobile phone, a tablet, or the like that is flexible, bendable, or folded.

The elastic member may be applied to a flexible display device such as a mobile phone or a tablet that is flexible, bent, or folded, and may improve reliability of a flexible display device by improving folding reliability in a display device that is repeatedly folded or restored.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically shown in the embodiments may be modified and implemented. In addition, it should be construed that differences related to such a variation and such an application are included in the scope of the present invention defined in the following claims.

The invention claimed is:

1. An elastic member foldable with respect to a folding axis, the elastic member comprising:
a first surface and a second surface,
wherein the elastic member has a surface roughness applied to at least one of the first surface or the second surface,
wherein the elastic member is made of a rolled metal,
wherein the surface roughness provided on the at least one of the first surface or the second surface of the elastic member extends long in a direction corresponding to a rolling direction of the rolled metal,
wherein the elastic member comprises a first region adjacent to the folding axis and including the folding axis, and a second region provided around the first region and located farther from the folding axis than the first region,
wherein the elastic member is defined in a first direction perpendicular to the folding axis and a second direction perpendicular to the first direction and corresponding to the folding axis,
wherein the first region of the elastic member includes a first pattern part of a hole or a groove extending long in the second direction,
wherein a length of the first pattern part in the second direction is greater than a width of the first pattern part in the first direction, and
wherein a direction in which the surface roughness is extended is different from the second direction.

2. The elastic member of claim 1, wherein the first pattern part includes a plurality of first patterns spaced apart from each other in the second direction, and
wherein lengths of the plurality of first patterns in the second direction are greater than widths of the plurality of first patterns in the first direction.

3. The elastic member of claim 1, wherein the direction in which the surface roughness
is extended is closer to the first direction than the second direction.

4. The elastic member of claim 1, wherein the elastic member further includes a second pattern part of a hole or a groove formed in the second region,
wherein the second pattern part includes a plurality of second patterns spaced apart from each other in the second direction, and
wherein a length of each of the plurality of second patterns in the second direction is greater than a width of each of the plurality of second patterns in the first direction.

5. The elastic member of claim 1, wherein the elastic member comprises a first side end, and a second side end facing in the first direction,
wherein the plurality of first patterns include a first outer pattern formed closest to the first side end, and
wherein the plurality of second patterns include a second outer pattern formed closest to the first side end, and
wherein the first outer pattern is located closer to the first side end than the second outer pattern.

6. The elastic member of claim 1, wherein the second direction and the direction in which the surface roughness is extended have an angle of 50° to 130°.

7. The elastic member of claim 1, wherein the second direction and the direction in which the surface roughness is extended have an angle of 50° to 90°.

8. The elastic member of claim 1, wherein the second direction and the direction in which the surface roughness is extended have an angle of 90° to 130°.

9. The elastic member of claim 1, wherein a direction of the folding axis and the direction in which the surface roughness is extended have an angle of 50° to 130°.

10. The elastic member of claim 1,
wherein an elastic modulus in the direction in which the surface roughness is extended is smaller than the elastic modulus in the second direction.

11. The elastic member of claim 3, wherein a resilience coefficient in the direction in which the surface roughness is extended is greater than a resilience coefficient in the second direction.

12. The elastic member of claim 1, wherein, the elastic member includes a first layer and a second layer,
wherein the first pattern part is formed on the first layer.

13. The elastic member of claim 12, further comprising an adhesive layer disposed between the first layer and the second layer.

14. The elastic member of claim 12, wherein the second layer is disposed in the second region.

15. The elastic member of claim 13, wherein the adhesive layer is disposed in the second region.

16. The elastic member of claim 1, wherein, the elastic member includes a first layer, a second layer and a third layer,
wherein the first layer is disposed between the second layer and the third layer,
wherein the first pattern part is disposed on the second layer and the third layer.

17. A display device comprising:
the elastic member of claim 1; and
a panel disposed on the elastic member and including at least one panel of a display panel and a touch panel.

* * * * *